(12) United States Patent
Kitamura

(10) Patent No.: US 7,672,030 B2
(45) Date of Patent: Mar. 2, 2010

(54) HOLOGRAPHIC FINE-LINE PATTERN

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/340,852

(22) Filed: Jan. 10, 2003

(65) Prior Publication Data
US 2004/0070800 A1 Apr. 15, 2004

(30) Foreign Application Priority Data
Oct. 15, 2002 (JP) ............... 2002-299757

(51) Int. Cl.
G03H 1/00 (2006.01)
G03H 1/08 (2006.01)
G03H 1/26 (2006.01)
(52) U.S. Cl. .................. 359/2; 359/9; 359/23
(58) Field of Classification Search ...... 359/2, 359/22, 23, 25, 32, 9, 15, 569, 24; 283/86; 430/1
See application file for complete search history.

(56) References Cited

U.S. PATENT DOCUMENTS

| 4,807,971 | A | * | 2/1989 | Nurano | 359/32 |
| 4,987,479 | A | * | 1/1991 | Hopwood | 348/41 |
| 5,194,971 | A | * | 3/1993 | Haines | 359/9 |
| 5,561,537 | A | * | 10/1996 | Aritake et al. | 359/23 |
| 5,638,193 | A | * | 6/1997 | Trisnadi et al. | 359/11 |
| 5,969,863 | A | * | 10/1999 | Staub et al. | 359/567 |
| 6,311,470 | B1 | * | 11/2001 | Rosenwasser et al. | 59/80 |
| 6,369,919 | B1 | * | 4/2002 | Drinkwater et al. | 359/2 |
| 6,995,883 | B2 | * | 2/2006 | Deinhammer et al. | 359/2 |
| 2003/0165984 | A1 | * | 9/2003 | Finzel et al. | 435/7.1 |

FOREIGN PATENT DOCUMENTS

DE 199 15 943 A1 10/2000

OTHER PUBLICATIONS www.ntu.edu.sg/home5/PG02313072/struct2.jpg.*
Tomohisa Hamano, et al.; Computer-generated holograms for reconstructing multi 3-D images by space-division recording method; Proceedings of the SPIE, The International Society for Optical Engineering; XP009007446; Jan. 24, 2000, pp. 23-32; vol. 3956.
Alan Rhody, et al.; Artwork Origination & Mastering; Holography Marketplace—7th edition; XP002536139; Dec. 1998; pp. 23-34 (16 pages including advertisements).

* cited by examiner

*Primary Examiner*—Audrey Y Chang
(74) *Attorney, Agent, or Firm*—Sughrue Mion, PLLC

(57) ABSTRACT

The present invention relates to a three-dimensional security feature using a hologram which can not be counterfeited with color copying machines or diffraction grating image forming devices. The three-dimensional security feature comprises a hologram which is recorded in such a manner that it can be reconstructed to comprise at least two three-dimensional linear patterns when locally viewed, at least one of these two three-dimensional linear patterns having at least one portion which crosses the other linear pattern at the inner side and at least one portion which crosses the other linear pattern at the outer side.

6 Claims, 5 Drawing Sheets

HOLOGRAPHIC FINE-LINE PATTERN

BACKGROUND OF THE INVENTION

The present invention relates to a three-dimensional security feature (holographic fine-line pattern), and in particular, a three-dimensional security feature with enhanced counterfeit deterrent effect using hologram.

Conventionally, security features (fine-line patterns) created by printing have been used in the cash vouchers such as securities and banknotes for counterfeit deterrence. The conventional security features comprise geometric patterns with complicated combination of fine lines such as wave lines. However, due to the improvement of color copying machines in resolution and color reproducibility, counterfeit of these cash vouchers are increasing.

In addition, security features using diffraction gratings have also been practically used for imparting enhanced counterfeit deterrent effect. A security feature using the diffraction grating is often utilized as high level counterfeit deterrence measures as it can express the movement of light, and it can express fine patterns in high resolution, although in two-dimensional images. However, these security feature patterns using the diffraction grating which have been regarded as high level counterfeit deterrence technique are nowadays increasingly counterfeited, because the patterns recorded in it have come to be detected by microscopic observation and observation of the light movement, and because of the spread of the diffraction grating image forming devices using laser two-beam interference.

On the other hand, computer generated holograms (CGHs) have been known. There are generally two processes in the CGH producing technique, of which one is a process in which the object surface is replaced with a set of point light sources, known in the non-patent reference 1, 2, and others. The other is the use of the holographic stereogram, known in the patent reference 1 and the non-patent reference 3, and others.

The former process of the two, namely replacing the object surface with a set of point light sources, will be described here as a representative process.

As an example of CGHs, a binary hologram obtained by recording the intensity distribution of interference fringe, of which reconstructed image has parallax only in horizontal direction, and which is to be observed with white light from above, will be described in outline. Referring to FIG. 3, the shape of the object to be imaged in CGH is defined at step ST1. Then at step ST2, the space arrangements of the object, CGH plane, and reference light are defined. Then at step ST3, the object is divided in the vertical direction with horizontal slices, followed by replacement of the sliced surface with a set of point light sources. Then at step ST4, on the basis of these space arrangements, the intensities of the interference fringe between the light arriving from the point light sources constituting the object and the reference light are calculated for each sample point defined on the CGH plane, thereby obtaining the interference fringe data. Then at step ST5, the obtained interference fringe data are quantized. After that, at step ST6, the data are converted into a rectangular data for EB imaging, which are recorded at step ST7 on a medium by means of an EB imaging device, thus finally producing CGH.

In this calculation of the interference fringe, the hidden surface removal process is performed. The hidden surface removal process is a process of making a part, which is hidden by other object in front of it, invisible when an object is observed from a certain viewpoint, whereby the information of overlapping of objects is added to retina image, thus exhibiting a three dimensional effect. In the CGH recording, the hidden surface removal process is performed according to the following procedure.

As shown in FIG. 4, for each point light source constituting the object 1, the region in which the point light source is hidden by objects 1, 2 (the hatched area in FIG. 4) is obtained. In the case of CGH which is produced according to the procedure shown in FIG. 3, since the objects 1, 2 are sliced by horizontal surfaces and have parallax only in the horizontal direction, the region in which the point light sources on object 1 are hidden by objects 1, 2 is obtained from the positional relations between points and lines on each slice surface. The hidden surface removal process is a process in which, when a sample point of the interference fringe distributing on CGH plane is included in the region in which the point light sources are hidden obtained in the above (solid point in FIG. 4), that point light source at that sample point is eliminated from the calculation of the intensities of the interference fringe. From the image of object 1 reconstructed from CGH processed as above, the reconstruction light is not diffracted to the hatched area in FIG. 4, and the region of the object 1 corresponding to those point light sources becomes invisible because the region becomes behind the image of object 2 when an observer drops his viewpoint on that region.

In addition, it is also proposed in the patent reference 2 that color can be expressed with a CGH, produced by the process in which object surface is replaced by a set of point light sources, by reproducing the CGH with white light.

On the other hand, the inventor has proposed, in Japanese Patent Application No. 2001-365628, a CGH which is recorded in such a manner that a micro-object providing verifying information is arranged behind a covering object having a size easily recognizable by naked eyes, and the verifying information is hidden by the covering object and is not observable from a predetermined direction, but is observable from the other direction which is different from the predetermined direction. A representative example will be described with reference to FIG. 5. As shown in FIG. 5, verifying information which is a micro-object 11 such as a letter or a figure having such a size as not easily to be recognized by naked eyes, specifically having the largest size not greater than 300 μm, is arranged behind a covering object 12 having a size larger than micro-object 11 and easily recognizable with naked eyes arranged in front of the micro-object (nearer to the observer relative to the micro-object), at a position where micro-object 11 is covered by the covering object when viewed from the front, so that a viewer E can not observe the verifying information from the front (normal observing direction), and this arrangement is recorded in a CGH 10. For this end, the hidden surface removal process described above is performed on the set of point light sources expressing the micro-object 11, and the recording is performed in such a manner that the reconstruction light from the micro-object 11 does not diffract to a region at least between the line 21L and the line 21R in FIG. 5. The line 21L is a line passing the left end of the micro-object 11 and the left end of the covering object 12, and the line 21R is a line passing the right end of the micro-object 11 and the right end of the covering object 12, the front direction being included between the line 21L and the line 21R. In addition, the line 22L is a line drawn from the left end of the micro-object 11 toward upper left indicating a boundary of a region to which the reconstruction light from the left end of the micro-object 11 does not diffract, and the line 22R is a line drawn from the right end of the micro-object 11 toward upper right indicating a boundary of a region to which the reconstruction light from the right end of the micro-object 11 does not diffract.

In relation to the above, the right side emission angle $\gamma_2$ of the object light of micro-object 11 is set larger than the angle $\beta_2$ which is an angle between the line 21R connecting the right end of the micro-object 11 and the right end of the covering object 12 and the front direction, and the left side emission angle $\gamma_3$ of the object light of micro-object 11 is set larger than the angle $\beta_3$ which is an angle between the line 21L connecting the left end of the micro-object 11 and the left end of the covering object 12 and the front direction. Accordingly, as seen from FIG. 5, the angle range in which all or a part of the micro-object 11 is visible is $\gamma_2-\beta_2+\gamma_3-\beta_3$, while the angle range in which the micro-object is covered is $\beta_2+\beta_3$.

In this type of CGH, the presence of verifying information (micro-object 11) is difficult to be noticed because the recorded verifying information is too small to be recognized with naked eyes even under appropriate illumination. In addition, the presence of the verifying information is difficult to be noticed from the front direction which is the normal observation direction, even with the use of magnifying glass or other enlargement device, thus further enhancing the secrecy of verifying information and decreasing the danger of counterfeit.

In this type of CGH, the verification is performed by irradiating the hologram with appropriate illumination and observing it from a predetermined direction other than the front direction using magnifying glass or other enlargement device to reveal the verifying information (micro-object 11) The verifying information 11 can be confirmed as it disappears because it becomes behind the covering object 12 when the observation position is moved to the front where the observer's direction is the normal observation direction.

[Patent Reference 1]
Japanese patent No. 3,155,263
[Patent Reference 2]
Japanese unexamined patent publication 2000-214751
[Non-Patent Reference 1]
"Image Labo" April 1997 (Vol. 8, No. 4) p. 34-37
[Non-Patent Reference 2]
3D-Image Conference '99 Proceedings CD-ROM (Jun. 30-Jul. 1, 1999 at Kogakuin University Shinjuku Campus) "Image Type Binary CGH by EB Imaging (3)—The Enhancement of Three-Dimensional Effect by Hidden Surface removal/Shadowing"
[Non-Patent Reference 3]
Research Society of Holographic Display (Optical Society of Japan, Japan Society of Applied Physics), The Third Hodic Conference Proceedings (Nov. 15, 1995, at Nihon University Surugadai Campus, Building No. 1, Meeting Room No. 2) "The Speed Up of Two-Dimensional Image Sequence Generation for Holographic Stereogram"

SUMMARY OF THE INVENTION

As described above, conventional security features are easily counterfeited and forgery is increasing.

The present invention is made in order to resolve such problems of the prior art, and it is the object of the present invention to provide a three-dimensional security feature using a hologram which can not be counterfeited by neither of color copying machine nor diffraction grating image forming device.

The three-dimensional security feature of the present invention which can achieve above described object is characterized in that a hologram is recorded in such a manner that it can be reconstructed to comprise at least two three-dimensional linear patterns when observed locally, wherein at least one of the said at least two linear patterns has at least one portion which crosses the other linear pattern at outer side and at least one portion which crosses the other linear pattern at inner side.

In this connection, the hologram is preferably recorded as a computer generated hologram. Such computer generated hologram can be recorded using the process in which object surface is replaced with a set of point light sources, or the holographic stereogram process.

Further, the hologram can also be produced by constructing the at least two three-dimensional linear patterns when observed locally as a model, and photographing the interference between the object light from the model surface and a reference light.

Further, the width of the linear pattern is preferably not greater than 300 μm.

Further, the hologram is preferably recorded in such a manner that the at least two three-dimensional linear patterns are recognized with naked eyes as a whole as one linear pattern.

Further, the at least two three-dimensional linear patterns are preferably constructed in such a manner that they have at least one interruption in the vicinity of the inner region of the portion where the two linear patterns cross each other.

Further, the at least two three-dimensional linear patterns can be constructed in such a manner that the outer locating linear pattern has greater width than the inner locating linear pattern at the portion where the two linear patterns cross each other.

Further, the at least two three-dimensional linear patterns can be constructed in such a manner that micro-letters or geometric micro-figures are three-dimensionally arranged in the inner region of the portion where the two linear patterns cross each other.

Further, the at least two three-dimensional linear patterns are preferably recorded in such a manner that they are reconstructed within 1 mm depth from the hologram plane.

Further, the at least two three-dimensional linear patterns can be recorded in such a manner that they are reconstructed in different colors from each other.

In addition, the present invention includes documents on which the three-dimensional security feature described above is provided.

In the present invention, a hologram is recorded in such a manner that it can be reconstructed to comprise at least two three-dimensional linear patterns when observed locally, wherein one of said at least two linear patterns has at least one portion which crosses the other linear pattern at outer side and at least one portion which crosses the other linear pattern at inner side. Accordingly, the information existing in the inner region of the portion where two linear patterns cross each other is difficult to be noticed, and such information is difficult to be duplicated with color copying machines, or to be counterfeited with diffraction grating image forming devices, thereby significantly enhancing the counterfeiting deterrent effect of the security feature.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, the basic principle and embodiments of the three-dimensional security feature according to the present invention will be described.

The basic principle of the present invention comprises holographically recording a three-dimensional image with an arrangement in which at least two linear patterns entangle with each other when viewed locally, and especially, recording the image as a computer generated hologram (CGH) When the three-dimensional security feature recorded as such hologram is irradiated by a predetermined illumination, a three-dimensional image with an arrangement in which at least two linear patterns entangle with each other is reconstructed.

Figure 3:
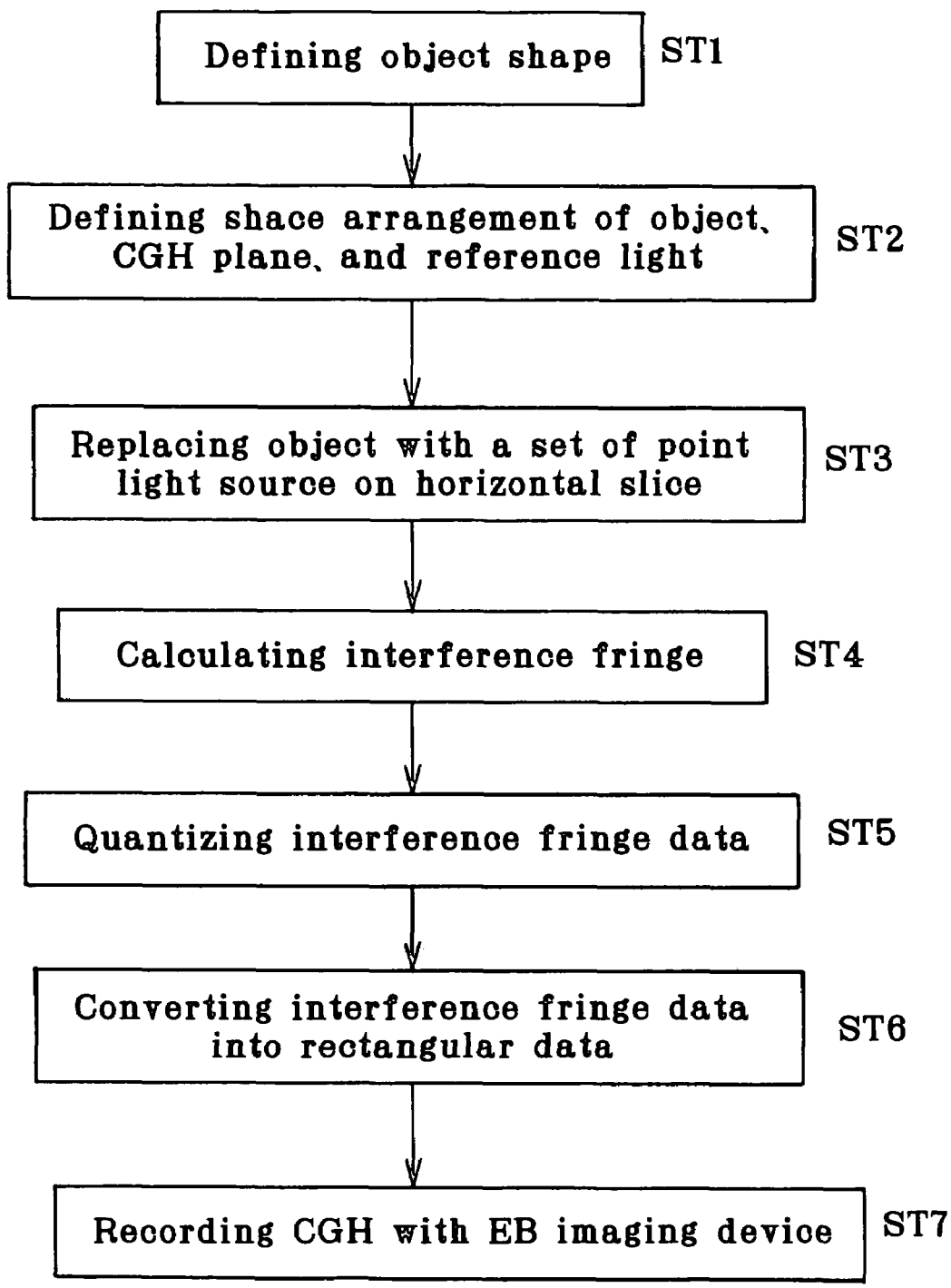
FIG. 3 is a flow chart schematically showing the procedure of producing CGH according to the process in which object surface is replaced with a set of point light sources.
Figure 4:
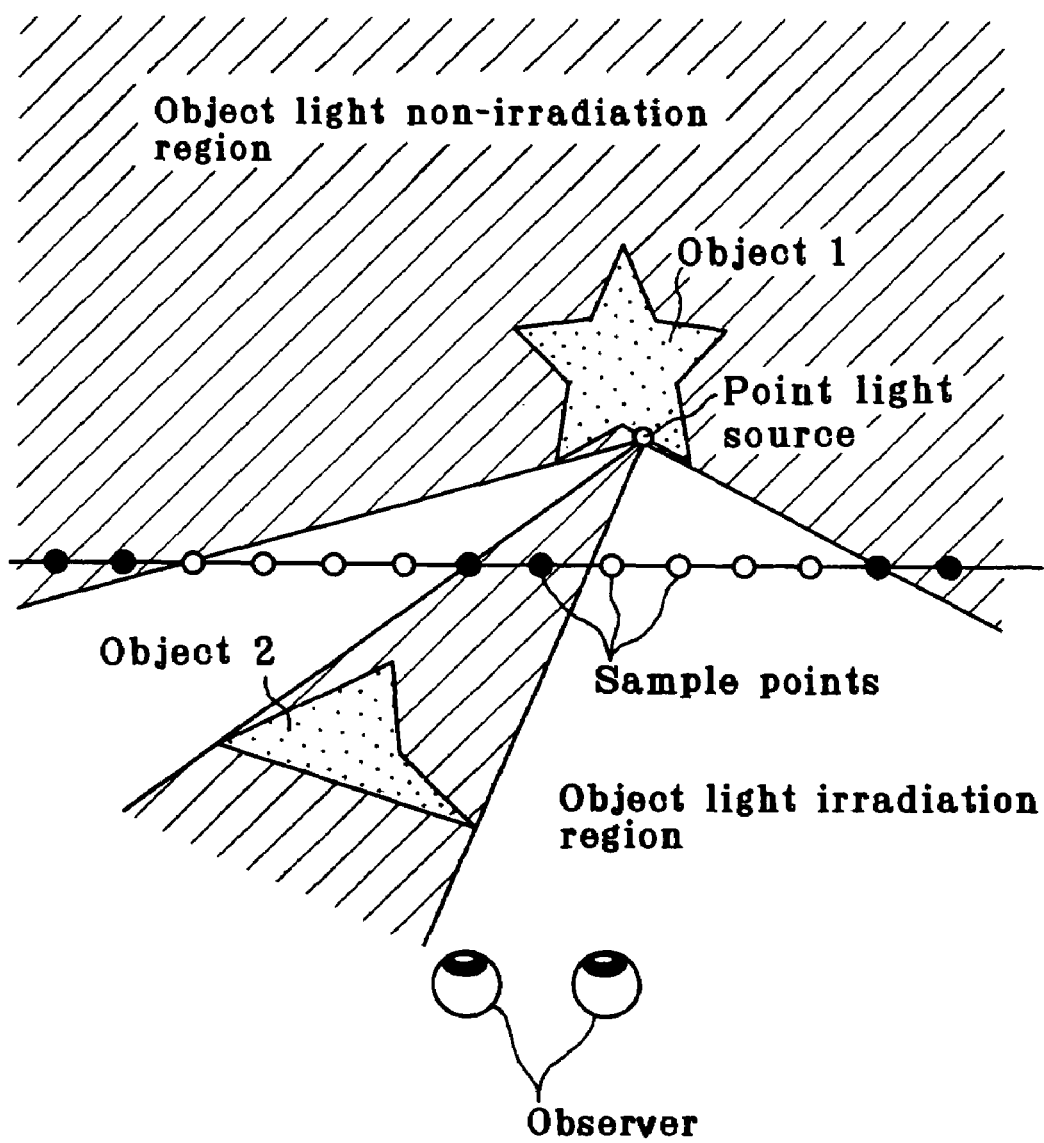
FIG. 4 is an illustration for explaining the hidden surface removal process of a CGH recording.

Specifically, for example, at step ST1 in FIG. 3 an original image of a three-dimensional security feature comprising three-dimensionally entangled arrangement is precisely created by means of a 3D-CAD for computer graphics. Then at step ST2, the space arrangements of the three-dimensional security feature, CGH plane, and reference light are defined. Then at step ST3, the lines of the three-dimensional security feature are replaced with a set of point light sources or linear light sources, and the hidden surface removal process shown in FIG. 4 is performed. At step ST4, on the basis of these space arrangements, interference fringe data is obtained by calculation of intensities of interference fringe between the light coming from each point light source or linear light source constructing the line of the three-dimensional security feature, and a reference light. Then at step ST5, the obtained interference fringe data are quantized. After that, at step ST6, the data are converted into rectangular data for EB imaging. Then at step ST7, the data is recorded on a medium by an EB imaging device. In this manner, the three-dimensional security feature of the present invention created utilizing the process in which object surface is replaced with a set of point light sources is produced.

Figure 1:
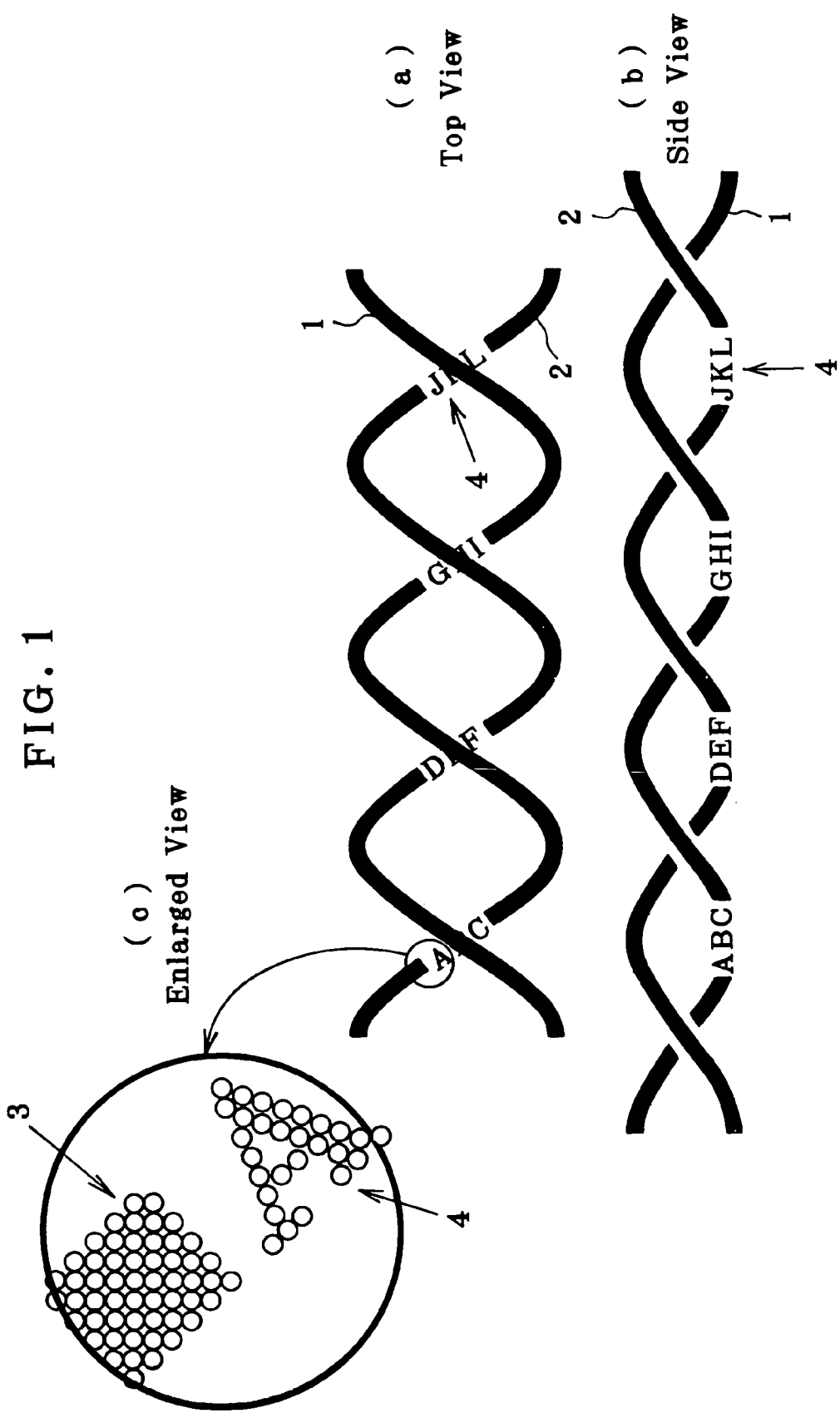
FIGS. 1(a)-1(c) are illustrations of an example of three-dimensional image to be used for the security feature according to the present invention in which at least two linear patterns entangle with each other.

A specific example of the three-dimensional image with an arrangement in which at least two linear patterns entangle with each other when viewed locally is shown in FIGS. 1(a)-1(c). As shown in FIG. 1(a) as its top view, in FIG. 1(b) as its side view, and in FIG. 1(c) as its enlarged view of a part of the linear patterns, the image is composed of two spiral linear patterns 1, 2. In the case of FIGS. 1(a)-1(c), the two spiral linear patterns 1, 2 entangle with each other counterclockwise. The direction of spiral entanglement may be either clockwise or counterclockwise, or it may be reversed at somewhere in the midway. As shown in FIG. 1(c), the substances of the linear patterns 1, 2 are formed as a set of very small points 3 (when the process in which object surface is replaced with a set of point light sources is used).

Figure 5:
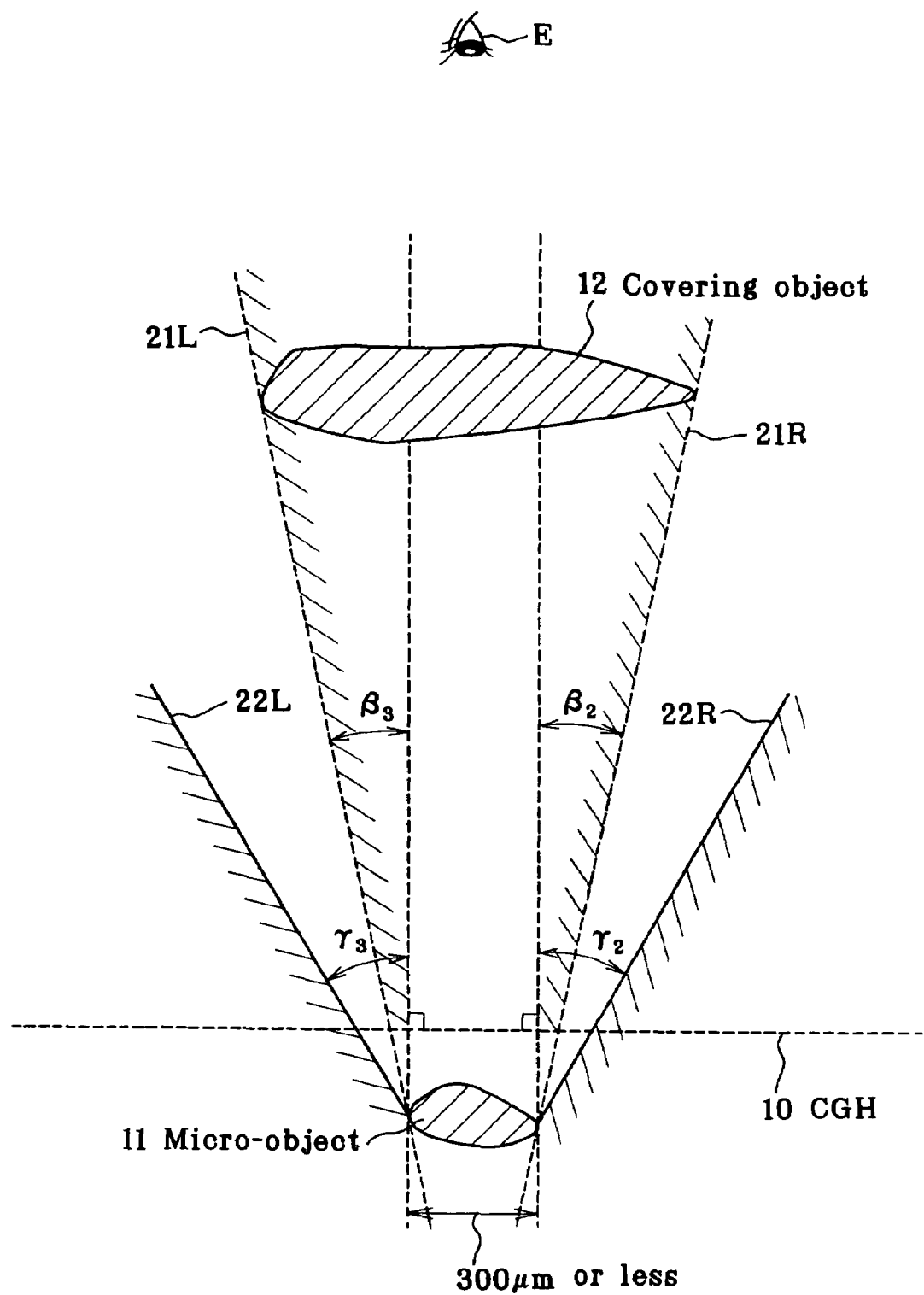
FIG. 5 is an illustration for explaining a micro-object, a covering object, and the range of the object light of a CGH comprising verifying information according to the prior application.

Of the two linear patterns 1, 2 composing the security feature, a part of linear pattern 1 or 2 which is located behind the other linear pattern 2 or 1 (inner region of the portion where the linear patterns 1, 2 cross each other with one in the background of the other) can be interrupted, and in this interrupted region very small micro-letters or geometric micro-figures (micro-patterns) 4 can be three-dimensionally arranged. In such constitution, as described with reference to FIG. 5, these micro-letters or geometric micro-figures 4 function as verifying information and the other linear pattern 1 or 2 functions as covering object so that the micro-letters or the geometric micro-figures 4 are hidden behind the other linear pattern 1 or 2 and can not be fully observed in an observation from a predetermined direction, for example from the front direction. However, they may be fully observable from the other direction than the predetermined direction, for example from an oblique direction. In this manner, a security feature which is more difficult to be counterfeited is achieved, further improving the security.

Figure 2:
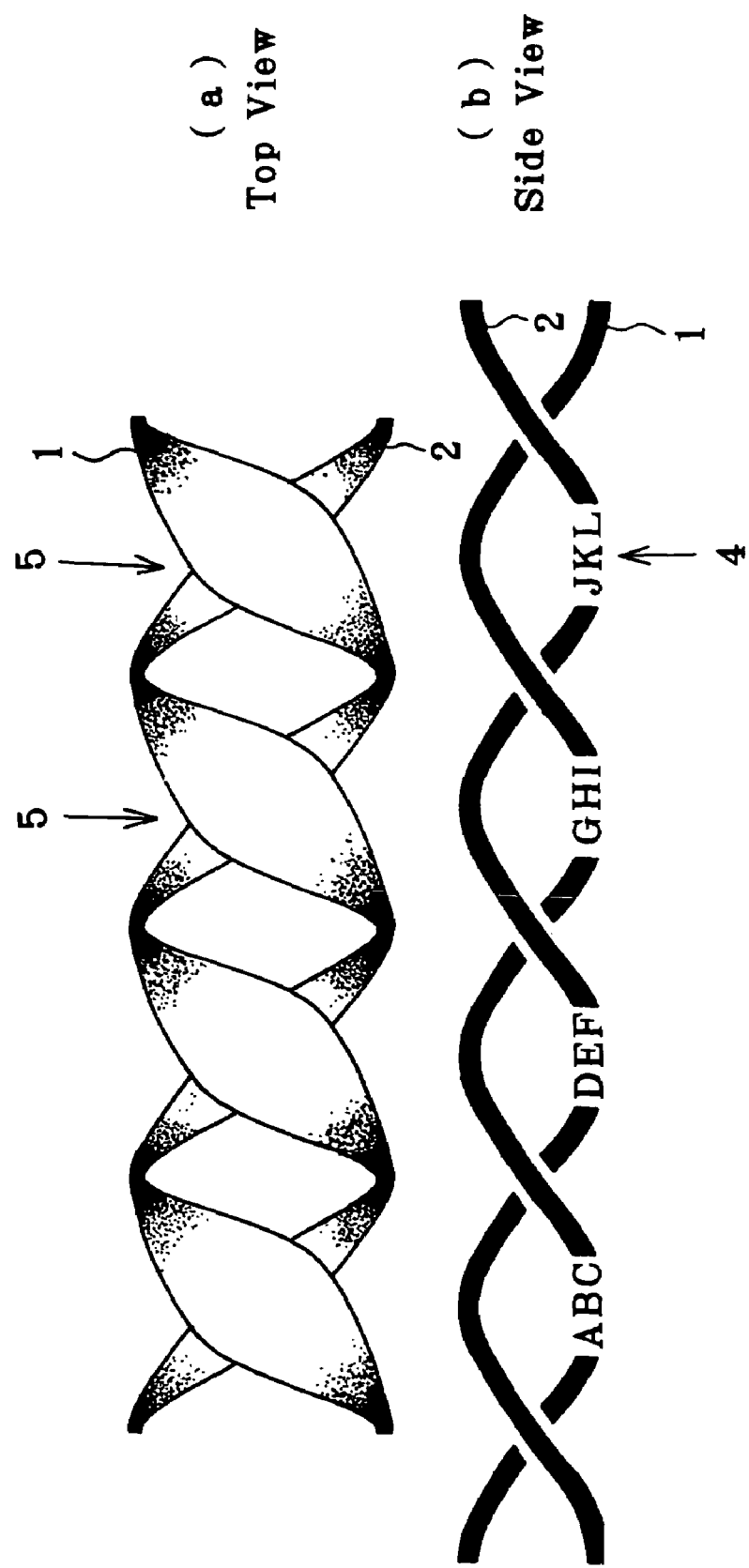
FIGS. 2(a)-2(b) are illustrations of another example of three-dimensional image to be used for the security feature according to the present invention in which at least two linear patterns entangle with each other.

FIGS. 2(a)-2(b) show another example of three-dimensional image in which at least two linear patterns three-dimensionally entangle with each other when viewed locally, in which FIG. 2(a) is a top view and FIG. 2(b) is a side view. In this example, the image is composed of, for example, two spiral linear patterns 1 and 2, the two linear patterns 1, 2 entangling with each other counterclockwise in this case. Similarly to the case of FIG. 1, the direction of the spiral entanglement may be either clockwise or counterclockwise, or it may be reversed at somewhere in the midway. Further in this case, the sense of depth can be enhanced by perspective effect in an arrangement in which the width of the outer linear pattern 1 or 2 is larger than that of inner linear pattern 2 or 1 at the portion where the two linear patterns 1, 2 composing the security feature cross each other with one in the background of the other. This portion with larger width is indicated by reference numeral 5. Further, the security effect can be enhanced by arranging micro-letters or geometric micro-figures 4 hidden behind the portion with larger width 5 of the outer linear pattern 1 or 2, thus making the counterfeit more difficult. In this case too, when CGH is produced using the process in which object surface is replaced with a set of point light sources, the linear patterns 1, 2 an the micro-letters or the geometric micro-figures 4 can be constructed as a set of very small points 3 (see FIG. 1(C)).

The linear patterns 1, 2 are effective as counterfeit deterrent security feature when they are recorded with a line width difficult to be recognized by naked eyes. Specifically, it is preferable that the line width is not greater than 300 µm.

Further, the plurality of linear patterns 1, 2 which three-dimensionally entangle with each other are preferably recorded in such a manner that they are recognized with naked eyes as a whole as one linear pattern.

Further, the two linear patterns 1, 2 in FIGS. 1(a)-1(c) may be one linear pattern which is folded back and three-dimensionally entangles with itself.

Further, the linear patterns 1, 2 are preferably arranged within 1 mm depth from the CGH plane, because the farther they are arranged from the CGH plane, the more blurred and more difficult to be observed the reconstructed images become.

Further, it is also preferable that the two linear patterns 1, 2 are recorded in such a manner that they are reconstructed in different colors from each other. As one of the techniques to achieve this, the process proposed in the patent reference 2 can be employed.

Further, the hologram constituting the three-dimensional security feature of the present invention can be produced by constructing the linear patterns 1, 2 as a model and photographing the model by an ordinary hologram process using two-beam interference. However, when the widths of the linear patterns 1, 2 are not greater than 300 µm, the computer generated hologram process as described above is preferable because the ordinary hologram photographing process is difficult to perform for this width.

Further, the three-dimensional security feature according to the present invention can be constituted as transfer film or label which can be transferred or attached to documents such as securities and banknotes, such documents being included in the range of the present invention.

While the present invention has been described in the above in the context of principle and embodiments thereof, the invention is not limited to these embodiments and various modifications may be made.

As apparent from the above description, according to the three-dimensional security feature of the present invention, a hologram is recorded in such a manner that it can be reconstructed to comprise at least two three-dimensional linear patterns when locally viewed, wherein at least one of the at least two three-dimensional linear patterns has at least one portion which crosses the other linear pattern at the inner side and at least one portion which crosses the other linear pattern at the outer side. This arrangement makes the presence of the information existing in the inner region of the portion where the linear patterns cross each other difficult to be noticed. Further, the existence of the information is difficult to be noticed from normal observation direction even with the use of enlargement means such as magnifying glass, and the information is impossible to be duplicated with color copying machines or to be counterfeited with diffraction grating image forming devices, thereby significantly enhancing the counterfeit deterrent effect of the security feature.

What is claimed is:

1. A three-dimensional security feature comprising a hologram having interference fringes recorded therein, wherein said hologram is recorded in such a manner that it is used to reconstruct an image comprising at least two three-dimensional linear patterns, at least one of said at least two three-dimensional linear patterns having at least one portion which crosses the other linear pattern at an inner side and at least one portion which crosses the other linear pattern at an outer side,
   wherein the at least two three-dimensional linear patterns are recorded in such a manner that the two three-dimensional linear patterns are viewed as one linear pattern when viewed with naked eyes
   wherein the interference fringes represent calculated interference fringes between the light coming from a set of point light sources positioned at a surface of the two three-dimensional linear pattern and a reference light
   wherein said three-dimensional security feature is recorded as a computer generated hologram and
   wherein the line widths of the linear patterns are not greater than 300 µm.

2. The three-dimensional security feature of claim 1, wherein the at least two three-dimensional linear patterns are constructed in such a manner that the outer located linear pattern has a larger width than the inner located linear pattern at the portion where the at least two linear patterns cross each other.

3. The three-dimensional security feature of claim 1, wherein the at least two three-dimensional linear patterns are constructed in such a manner that three- dimensionally arranged very small micro-letters or geometric micro-figures are arranged in the inner region of the portion where the at least two linear patterns cross each other.

4. The three-dimensional security feature of claim 1, wherein the at least two three-dimensional linear patterns are recorded in such a manner that they are reconstructed within 1 mm depth from a plane of the hologram.

5. The three-dimensional security feature of claim 1, wherein said at least two three-dimensional linear patterns are recorded in such a manner that they are reconstructed in different colors from each other.

6. A document being provided with a three-dimensional security feature as claimed in any one of claims 1 and 2-5.

* * * * *